(No Model.)
L. S. ROYER.
COFFEE POT.
No. 577,625. Patented Feb. 23, 1897.
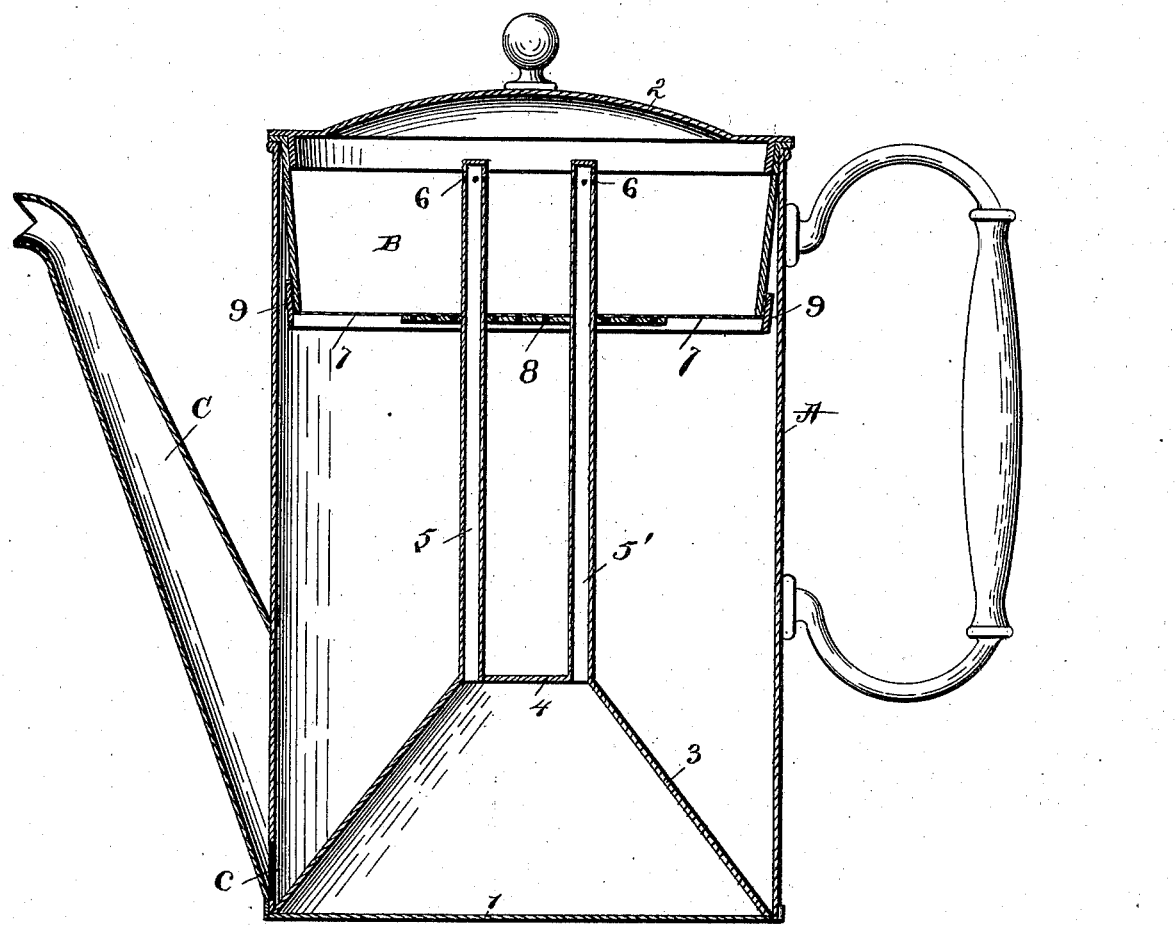
Witnesses
Geo. E. Frech,
A. F. Smith
Inventor
Lemon S. Royer
By H. B. Willson
Attorney

UNITED STATES PATENT OFFICE.

LEMON S. ROYER, OF HENRIETTA, TEXAS.

COFFEE-POT.

SPECIFICATION forming part of Letters Patent No. 577,625, dated February 23, 1897.

Application filed July 18, 1896. Serial No. 599,674. (No model.)

*To all whom it may concern:*

Be it known that I, LEMON S. ROYER, a citizen of the United States, residing at Henrietta, in the county of Clay and State of Texas, have invented certain new and useful Improvements in Coffee-Pots; and I do declare the following to be a full, clear, and exact description of the invention, such as will enable others skilled in the art to which it appertains to make and use the same.

My invention has relation to improvements in coffee-pots of that make or class wherein the water is forced to percolate through a body of coffee or tea held in a holder or receptacle near the top of the vessel; and the object is to provide a coffee-pot of simplified improved construction which will accomplish the purposes intended speedily, thoroughly, and satisfactorily.

I have fully and clearly illustrated my improved coffee-pot in the accompanying drawing, wherein its parts are shown in central vertical section, and reference is thereto had.

A designates a cylindrical shell constituting the body of the vessel, and made of any suitable sheet metal of any desired capacity or measure, and having a bottom 1 and a neatly-fitted lid or cover 2. In the bottom of the shell is located and suitably and tightly secured a tapering cylindrical water-receptacle 3, having a tight cover 4, substantially as shown in the drawing. On opposite sides of the cover 4 are secured two steam-pipes 5 $5^\times$, their lower ends opening into the water-receptacle 3 and having their upper ends closed and reaching well to the top of the shell, substantially as shown. In the steam-pipes 5 $5^\times$, closely adjacent to their upper ends, are formed a plurality of small jet-holes 6, through which the steam escapes from the pipes and impinges on the coffee, there to be condensed and percolate through the same.

B designates the receptacle for the tea or ground coffee, and consists of a sheet-metal vessel tapering from top to bottom, as shown, and provided with a cheese-cloth or wire-gauze bottom 7 to permit of the escape of the water drops therethrough. The steam-pipes 5 $5^\times$ are projected through the bottom of the coffee-receptacle, as indicated, and secured to them, in line with the cloth or gauze bottom 7, is a circular perforated shelf 8, which supports the weight of the ground coffee on the bottom and at the same time allows the condensed water to pass through.

The cloth or gauze bottom 7 of the receptacle B is removably secured thereto by a ring-clamp 9, which may be readily detached and the bottom 7 cleaned or replaced by a new one.

C designates the spout, opening into the shell or body a short distance above the bottom thereof and below the top of the water-receptacle. This arrangement of the spout constitutes an important adjunct and feature of my improvements, since by placing the opening *c*, as shown, about one-half an inch from the bottom the water must cover the opening to the spout before the operation is in complete progress. When enough condensed water has formed in the bottom of the shell to make a practical water seal around the edge of the tapering receptacle 3, it has also sealed the lower end or opening of the spout C, which prevents the steam from passing out the spout, thereby confining said steam within the pot.

The operation is as follows: The water-receptacle is supplied with water and the coffee deposited in the receptacle therefor, the lid placed in position, and the vessel placed on the stove. The water when it reaches the boiling condition will force the steam up the pipes, from which it escapes and is impinged and condensed on the coffee, which, becoming saturated and surcharged, the surplus drips through until the opening of the spout is closed by the water seal formed around the lower edge of the receptacle 3, when, the outer pressure being thus cut off, the water from the water-receptacle is forced up the pipes and the operation is speedily completed.

Having thus described my invention, what I claim, and desire to secure by Letters Patent, is—

A coffee-pot comprising the cylindrical vessel A, having a closed bottom and a detachable cover, a conical water vessel 3 located in the bottom thereof, pipes 5 $5^\times$ leading from said water-receptacle, and having steam-jet holes 6 6 located contiguous to their upper closed ends, a perforated horizontal shelf 8, fixed to said pipes, a coffee-receptacle arranged in the upper end of said vessel A and provided with a flexible perforated bottom supported by said shelf 8, and a discharge-spout opening into the vessel A immediately contiguous to its bottom, substantially as shown and described.

In testimony whereof I hereunto affix my signature in presence of two witnesses.

LEMON S. ROYER.

Witnesses:
 C. L. FORD,
 C. R. ROYER.